US012450864B2

(12) United States Patent
Öhrn et al.

(10) Patent No.: US 12,450,864 B2
(45) Date of Patent: Oct. 21, 2025

(54) OBJECT RE-IDENTIFICATION IN VIDEO STREAMS

(71) Applicant: Axis AB, Lund (SE)

(72) Inventors: Anton Öhrn, Lund (SE); Markus Skans, Lund (SE); Niclas Danielsson, Lund (SE)

(73) Assignee: Axis AB, Lund (SE)

( * ) Notice: Subject to any disclaimer, the term of this patent is extended or adjusted under 35 U.S.C. 154(b) by 357 days.

(21) Appl. No.: 18/312,126

(22) Filed: May 4, 2023

(65) Prior Publication Data
US 2023/0360360 A1    Nov. 9, 2023

(30) Foreign Application Priority Data

May 9, 2022  (EP) .................................... 22172349

(51) Int. Cl.
G06K 9/00      (2022.01)
G06V 10/40     (2022.01)
G06V 10/44     (2022.01)
G06V 20/50     (2022.01)

(52) U.S. Cl.
CPC ............ G06V 10/443 (2022.01); G06V 10/40 (2022.01); G06V 20/50 (2022.01)

(58) Field of Classification Search
None
See application file for complete search history.

(56) References Cited

U.S. PATENT DOCUMENTS

| 7,756,295 | B2* | 7/2010  | Yokoi     | G06V 20/52   |
|           |     |         |           | 348/700      |
| 8,873,861 | B2* | 10/2014 | Motoi     | H04N 21/8456 |
|           |     |         |           | 382/209      |
| 10,395,385| B2* | 8/2019  | Zhou      | G06T 7/70    |
| 10,795,928| B2* | 10/2020 | Matsubara | G06T 7/248   |
| 10,872,424| B2* | 12/2020 | Daniel    | G06T 7/248   |

(Continued)

FOREIGN PATENT DOCUMENTS

| CN | 103065126 A | 4/2013 |
| CN | 109934177 A | 6/2019 |

(Continued)

OTHER PUBLICATIONS

Iqbal et al., "Who is the hero? semi-supervised person re-identification in videos," 2014 International Conference on Computer Vision Theory and Applications (VISAPP), Lisbon, Portugal, 2014, pp. 162-173. (Year: 2014).*

(Continued)

*Primary Examiner* — Feng Niu
(74) *Attorney, Agent, or Firm* — Volpe Koenig

(57) ABSTRACT

The present disclosure generally relates to a method for weighting of features in a feature vector of an object detected in a video stream capturing a scene, comprising: determining a feature vector comprising a set of features for a detected object in the video stream; acquiring a reference feature vector of a reference model of the scene; and assigning a weight to at least one feature of the determined feature vector, wherein the weight for a feature of the determined feature vector depends on a deviation measure indicative of a degree of deviation of the feature from a corresponding feature of the acquired reference feature vector of the reference model.

10 Claims, 8 Drawing Sheets

(56) References Cited

U.S. PATENT DOCUMENTS

| | | | |
|---|---|---|---|
| 10,963,893 B1* | 3/2021 | Sharma | G06F 18/256 |
| 11,308,158 B2* | 4/2022 | Matsubara | G06T 7/248 |
| 11,914,638 B2* | 2/2024 | Abad Peiro | G06F 16/55 |
| 2007/0127817 A1* | 6/2007 | Yokoi | G06V 20/52 |
| | | | 382/181 |
| 2013/0156321 A1* | 6/2013 | Motoi | G06V 20/47 |
| | | | 382/190 |
| 2016/0092736 A1* | 3/2016 | Mai | G06V 40/10 |
| | | | 382/103 |
| 2018/0081908 A1* | 3/2018 | Matsubara | G06F 16/5854 |
| 2018/0374233 A1* | 12/2018 | Zhou | G06F 18/22 |
| 2020/0097501 A1* | 3/2020 | Matsubara | G06F 16/75 |
| 2020/0193619 A1 | 6/2020 | Danielsson et al. | |
| 2020/0257940 A1* | 8/2020 | Leung | G06V 20/52 |
| 2021/0064880 A1* | 3/2021 | Zhang | G06N 20/00 |
| 2021/0201009 A1* | 7/2021 | Wu | G06V 20/52 |
| 2022/0058448 A1* | 2/2022 | Abad Peiro | G06F 18/22 |
| 2022/0292286 A1* | 9/2022 | Subramanian | G06T 7/277 |
| 2022/0331028 A1* | 10/2022 | Sternitzke | G05D 1/0094 |

FOREIGN PATENT DOCUMENTS

| | | | | |
|---|---|---|---|---|
| CN | 109948425 A | | 6/2019 | |
| CN | 112288865 A | * | 1/2021 | G06V 20/41 |

OTHER PUBLICATIONS

Lee, "Visualization for neural-network-based person re-identification," 2022 IEEE 15th Pacific Visualization Symposium (PacificVis), Tsukuba, Japan, 2022, pp. 171-175, doi: 10.1109/PacificVis53943.2022.00027. (Year: 2022).*

Collins et al., "Online selection of discriminative tracking features," in IEEE Transactions on Pattern Analysis and Machine Intelligence, vol. 27, No. 10, pp. 1631-1643, Oct. 2005, doi: 10.1109/TPAMI.2005.205. (Year: 2005).*

CN-112288865-A (machine translation) (Year: 2021).*

Hamdoun et al., "Person re-identification in multi-camera system by signature based on interest point descriptors collected on short video sequences," 2008 Second ACM/IEEE International Conference on Distributed Smart Cameras, Palo Alto, CA, USA, 2008, pp. 1-6, doi: 10.1109/ICDSC.2008.4635689. (Year: 2008).*

Mohan, "Different Types of Object Detection Algorithms in Nutshell." Machine Learning Knowledge (2020). (Year: 2020).*

Organisciak, "Triplet Loss with Channel Attention for Person Re-identification." J. WSCG 27 (2019).

Liu et al., "Evaluating Feature Importance for Re-identification." In: Gong, S., Cristani, M., Yan, S., Loy, C. (eds) Person Re-Identification. Advances in Computer Vision and Pattern Recognition. Springer, London (2014).

Martinel et al., "Saliency Weighted Features for Person Re-identification," In: Agapito, L., Bronstein, M., Rother, C. (eds) Computer Vision—ECCV 2014 Workshops. ECCV 2014. Lecture Notes in Computer Science(), vol. 8927. Springer, Cham. (2015).

Chen et al., "Person Re-identification Using Group Context," In: Blanc-Talon, J., Helbert, D., Philips, W., Popescu, D., Scheunders, P. (eds) Advanced Concepts for Intelligent Vision Systems. ACIVS 2018. Lecture Notes in Computer Science(), vol. 11182. Springer, Cham. (2018).

* cited by examiner

OBJECT RE-IDENTIFICATION IN VIDEO STREAMS

FIELD OF INVENTION

The present disclosure generally relates to the field of camera surveillance, and in particular to object re-identification in video streams.

TECHNICAL BACKGROUND

In camera surveillance, object detection and object tracking are important functionalities. When tracking an object in a video stream, an object is observed at several instances, e.g., as a first object instance in a first image frame of the video stream and as a second object instance in a second image frame of the video stream, and the observed object needs to be re-identified as being the same object between the instances by an algorithm.

Object re-identification is a technology that can be used to compare object observations or object instances to decide if two observations are of the same object or not. The observations of one object may be accumulated over a so called tracklet. The comparison of object observations can be done within one camera field of view or across different camera field of views.

Object re-identification algorithms rely on off-line training. Based on their training the algorithms typically extract feature vectors, sometimes referred to as appearance vectors or re-identification vectors, from each object observation.

For re-identification, the task becomes to compare feature vectors extracted for two object observations, and possibly accumulated over tracklets, and if two feature vectors are considered similar, the corresponding objects are assumed to be the same. Consequently, a detected object of a first instance (or a first tracklet) can be re-identified as corresponding to a detected object of a second instance (or a second tracklet).

However, traditional object re-identification algorithms are not aware of the other objects in the scene and lack the ability to adapt to changes in the collection or distribution of the other objects in the monitored scene.

Accordingly, it would be desirable to improve object re-identification algorithms to better adapt to a present context of the monitored scene.

SUMMARY

In view of above-mentioned and other drawbacks of the prior art, provided are improvements with regards to object re-identification that can better adapt to the context of the monitored scene. By the context of the monitored scene is meant the circumstances or settings that clarify, define, or specify the monitored scene and the objects occurring in the scene. The context of the monitored scene may for example be men/women in dark suits/dresses in an underground station during rush hours when the objects in the scene mainly may be such men/women. In case of re-identification in such a scene, it is better to compare differentiating characteristics of the detected men/women than their dark suits/dresses. More specifically, provided is a method for weighting of features in a feature vector so that object re-identification in a video stream capturing the scene is improved.

According to a first aspect of the present disclosure, it is therefore provided a method for weighting of features in a feature vector of an object detected in a video stream capturing a scene, comprising: determining a feature vector comprising a set of features for a detected object in the video stream; acquiring at least one reference feature vector of a reference model of the scene; and assigning a weight to at least one feature of the determined feature vector, wherein the weight for a feature of the determined feature vector depends on a deviation measure indicative of a degree of deviation of the feature from a corresponding feature of the acquired reference feature vector of the reference model.

The present disclosure is based upon the realization to weight features of the feature vector depending on the contrast of that specific feature to that feature of other objects in the scene. Specifically, the present disclosure is based upon the realization to weight features of a detected object's feature vector depending on the contrast of that specific feature to the same feature of at least one reference feature vector representative of other objects in the scene. The other objects may be referred to as reference objects. The at least one reference feature vector may be included in a reference model (such as a reference model of men/women dressed in dark suits/dresses during rush hours in an underground station). The reference model may be determined based on feature vectors extracted from reference objects detected in the scene during a preceding time period and which reference objects belong to the same object class (such as human) and possibly also the same object type (such as men or women possibly dressed in a certain way) as the detected object. Thus, the reference model is to be used at time points or time periods when objects of the same object class and possibly also the same object type as the reference objects is expected to be present in the scene. The reference model can also be said to be representative of other objects detected in a scene at certain time points or time periods, e.g., representative of dark-dressed men/women in the underground station during rush hours. Contrasting traits of an object relative other detected objects in the scene are identified by determining a deviation between the feature vector of the object and the at least one reference feature vector of the other objects in the scene. More specifically, features of the feature vector of the object are evaluated in view of corresponding features of the reference feature vector of the reference model. If the objects in the scene are replaced or the collection of objects is varied, the reference model to which the feature vector of the detected object is compared is adapted accordingly. The collection of objects (e.g., men/women in dark suits/dresses) should be understood as the objects present in the scene. The collection of objects may be of the same object class and possibly also the same object type as the objects occurring in the scene during the time period when the reference model for the scene was determined. Thus, the reference model may be considered as specific for a certain collection of objects, e.g., as specific for objects of an object class and possibly also an object type in a specific scene during a certain time period, e.g., during a first time period of the day, such as morning rush at an underground station. However, as the collection of objects in the scene may change over time, an updated or a new reference model may be used, which updated or new reference model is representative of the collection of objects occurring in the scene at a second period of time. Thereby, the weighting of the features will adapt to the present context of the scene even if the collection of objects in the scene changes.

Preferably, one weight is assigned to each one of the features of the determined feature vector, i.e., one weight per feature.

The weights provide for enhancing features that deviate more from features of other objects in the scene, i.e., of the objects of the reference model used for that scene, than features that deviate less from features of the other objects in the scene. Features that deviate more from the corresponding features of the reference model are more useful for re-identification than features that deviate less from the corresponding features of the reference model. The reason being that features that are similar to features of the reference model do not distinguish the object from the reference model and when two object observations are to be compared to determine if they belong to the same object, it is better to give higher weights to their distinguishing features and compare them. For example, the weight may be in the range between 0 and 1, wherein a feature assigned with the value 0 indicates that the feature is not useful for re-identification while a feature assigned with the value 1 indicates that the feature is useful for re-identification. As another example, the weight of a specific feature in a determined feature vector may be set equal to the number of standard (or variance) deviations its value is from the mean value of the corresponding feature in the reference feature vector.

Thus, it was further realized that for object re-identification, when two feature vectors are compared, a higher weighted feature can be given more emphasis than features with lower weights. Thus, the weighting of features advantageously provides for object re-identification that is adapted to the other objects that set the present context of the scene. In other words, even if the overall appearance of the scene is adapted due to new objects entering the scene or objects leaving the scene, the weights are still adapted for efficient re-identification. As previously mentioned, if new objects enter the scene or if objects leave the scene, the reference model may be updated or a new reference model may be determined to reflect the new collection of objects in the scene.

A video stream is generally a set of consecutive image frames captured over time. The consecutive image frames collectively form the video stream.

A feature vector is generally an n-dimensional vector of numerical features that represent an object. This is a common representation of an object for e.g., machine learning algorithms which typically require a numerical representation of objects for facilitating for example data processing and statistical analysis. The feature vector for the object is extracted from an image of the object. The image may be an image crop of the detected object outputted from an object detector and fed into a feature vector extractor.

The reference model includes one or more reference feature vectors representing objects detected in the monitored scene. The objects detected in the scene during the determination of the reference model may be referred to as a reference collection of objects which is considered to be representative of other objects in the scene during another time period when the same class and type of objects are expected in the scene. Thus, the reference model used can be said to also be descriptive of a present collection of objects in the monitored scene including natural scene variations such as light conditions and weather variations. The reference model is constructed by collecting and saving reference feature vectors of the observed object instances in the scene. The collected reference feature vectors of the reference model are indicative of a typical reference feature vector acquirable from the scene. Using the collected reference feature vectors enables generating a measure of the variations of specific features. For example, a reference feature vector may be created by calculating an average reference feature vector of a set of feature vectors of the reference model and the corresponding variance of the average feature vector. The average reference feature vector may be acquired and used for the step of assigning weights.

Accordingly, the reference model represents detections made in the video stream of the scene and more specifically represents at least one reference feature vector of detections in the video stream. The reference model is constructed from detections that may be made from the acquired video stream for a given time period during which the collection of objects in the scene are expected to be relatively constant. Alternatively, or additionally, the reference model is constructed from a certain number of detections, e.g., a number of hundreds detections, that may be made from the acquired video stream for a given time period during which the collection of objects in the scene are expected to be relatively constant. The given time period and/or the number of detections may vary, but it should be understood that the detection of the objects, the feature vectors of which creates the reference model, should continue during a sufficiently long time period and/or be of a sufficient number to obtain a representative reference model for the present context of the scene. A representative reference model may be considered obtained when the feature vectors of detected new objects have a small impact on the reference model, i.e., the feature vectors of the new objects confirm the reference model rather than change the reference model. In other words, a representative reference model may be considered obtained when the feature vectors of the new objects are equal or similar to an average or median reference feature vector of the reference model.

It may be possible to include that, as the collection of objects in the scene changes, so may the reference feature vector of the reference model since the detections made in the video stream will consequently, also change. In one possible implementation, this may result in an updated or further reference model valid for a second time period. In other words, the reference feature vectors may adapt as the scene is varied by for example further or new objects entering the scene. Therefore, the weights assigned to the determined feature vector of the detected object are altered depending on the present context of the scene.

The deviation measure may be a direct comparison between corresponding features of the reference model and the determined feature vector from a single object observation. However, a more accurate comparison may be to compare the features of the determined feature vector to a corresponding feature of the reference model over an entire tracklet. In such case, the average or the median of all observations of a specific feature can be compared to the corresponding average or median feature of the reference model feature vectors.

It is appreciated that an object may herein refer to a material object, a person, or an animal, in other words, any type of object that may be captured in a video stream and that may be tracked. A material object may for example be a vehicle such as a truck, a car, or a motor bike but it could also be a bag.

In one embodiment, features in the determined feature vector with large deviations from the corresponding feature of the acquired reference feature vector may be assigned higher weights than features in the determined feature vector with smaller deviations from the corresponding feature of the acquired reference feature vector. In other words, a feature that is considered sufficiently unique compared to the reference model is assigned with a large weight compared to a less unique feature. This advantageously provides for distinguishing unique features that facilitates for tracking of an object in the video stream.

The reference model may include multiple reference feature vectors representing all or some of the objects detected in the monitored scene. A collective feature vector may be calculated from all or some of the reference feature vectors. For example, the reference model may be a median feature vector of all or some of the reference feature vectors along with a variation for each feature.

Accordingly, in one embodiment, the acquired reference feature vector may be a collective feature vector calculated from all or some of multiple reference feature vectors of the reference model. In this way, the reference model provides an overall representation of objects present and detectable in the video stream to thereby further improve an adaptable weighting that depends on the appearance of multiple detected objects in the scene. As an example, the acquired reference feature vector may be a collective median feature vector of all the observed objects along with the variance for each feature.

In one embodiment, the collective feature vector may represent multiple detected objects during a time duration, where the collective feature vector is updated for subsequent time durations. Hereby, the adaptive nature of the reference model and the weighting is further improved.

In one embodiment, the determined feature vector may be a first feature vector for the detected first object, the method may further comprise: determining at least one further feature vector comprising a set of features for the detected first object, wherein the step of assigning may comprise: assigning the weights to at least one feature of the determined first feature vector further depending on a degree of similarity with a corresponding feature of the determined at least one further feature vector. Hereby, if a feature is similar across at least two object instance observations, and especially if this feature deviates from the reference model, the specific feature is assigned higher weights than other features of the feature vector. This advantageously provides more robust weighting with regards to temporary occlusions, image noise and other nuisances including scene light changes and weather. More specifically, features with assigned weights that are persistent over consecutive or subsequent object detections, i.e., consecutive, or subsequent feature vectors, are preferably assigned higher weights than features that are less persistent over consecutive or subsequent object detections or feature vectors.

In one embodiment, the video stream may be captured by an image acquisition device configured to monitor a single scene.

According to a second aspect of the present disclosure, there is provided a method for performing re-identification of an object detected in a video stream capturing a scene, the method comprising: assigning weights to features of a first feature vector of a detected first object using the method according to first aspect; assigning weights to features of a second feature vector of a detected second object using the method according to first aspect; and re-identifying the detected second object as being the detected first object when the first feature vector is determined to correspond to the second feature vector according to a similarity measure between the first and second feature vector, the similarity measure is calculated using the assigned weights so that features with higher weights are emphasized more than features with lower weights.

The disclosure is further based on a similarity measure that takes the assigned weights into account when comparing two feature vectors. For example, the similarity measure may be obtained by calculating a Euclidean distance or a Mahalanobis distance between two feature vectors or between one or more features of two feature vectors. If corresponding features of the two feature vectors are assigned high weights, such as 1 or close to 1, due to large deviations from the reference model, their similarity are considered more important since they are more unique compared to the objects in the scene given by the reference model. Due to the uniqueness, the higher weighted features are more easily distinguished and more appropriate to use for re-identification compared to less unique features. In case of multiplicative weights, e.g., when weights are assigned to a plurality of features in the feature vector, all the weights of the feature vector may be selected such that a sum of them equals to 1.

Re-identifying generally includes to tag or in some other way identify that the two detections belong to the same object or e.g., object ID.

In one embodiment, the method may comprise assigning the same weights to features of the first feature vector and to corresponding features of the second feature vector, the weights being determined from an evaluation of the weights assigned to the first feature vector and the weights assigned to the second feature vector. For example, the evaluation may be to calculate an average weight of the two weights for corresponding features from the two feature vectors. As a further example, the evaluation may be to select the largest of the two weights for corresponding features from the two feature vectors.

In one embodiment, wherein the weights for the first feature vector of the detected first object may be generated using a first reference model, and the weights for the second feature vector of the detected second object may be generated using a second reference model. Thus, in this case, two separate reference models are used for different scenes. This provides for re-identification of an object detected in two different locations, e.g., monitored by different image acquisition devices.

In one embodiment, the weights assigned to a feature of the first feature vector and to a corresponding feature of the second feature vector depend on the feature of the first feature vector and the feature of the second feature vector that deviates most from the respective acquired reference feature vector. In other words, it is sufficient that one of the features of two corresponding features of the first and second feature vector deviates significantly from its reference model to provide a larger weight to both features.

In one embodiment, the weights assigned to a feature of the first feature vector and to a corresponding feature of the second feature vector may depend on the deviation from the acquired reference feature vector of the feature of the first feature vector and the feature of the second feature vector that deviates the least from the respective acquired reference feature vector. Thus, it may be required that a deviation from a corresponding reference model is present for both corresponding features of the first feature vector and the second feature vector to provide a large weight. In this way, higher weights are assigned for features that deviate from both reference models than those that do not deviate from both reference models. Phrased differently, the weights depend on the feature of the first feature vector and the feature of the second feature vector that deviates the least from the respective acquired reference feature vector.

In one embodiment, the method may comprise determining a first similarity measure using the first reference model, and a second similarity measure using a second reference model, wherein re-identifying may comprise: determining that the second object corresponds to the first object if any one of the first similarity measure and the second similarity measure indicates that the first feature vector corresponds to the second feature vector. This advantageously allows for using two separate reference models. It is envisaged that the two reference models may be associated with two different image acquisition devices without the need for combining the reference models.

Further embodiments of, and effects obtained through this second aspect of the present disclosure are largely analogous to those described above for the first aspect and the second aspect of the disclosure.

According to a third aspect, there is provided a control unit configured to execute the steps of the method according to anyone of the herein disclosed embodiments.

Further embodiments of, and effects obtained through this third aspect of the present disclosure are largely analogous to those described above for the first aspect and the second aspect of the disclosure.

According to a fourth aspect of the present disclosure, there is provided a system comprising a control unit according to the third aspect, and an image acquisition device for capturing images of a scene including objects.

The image acquisition device may be a camera, such as a surveillance camera.

Further embodiments of, and effects obtained through this fourth aspect of the present disclosure are largely analogous to those described above for the other aspects of the disclosure.

According to a fifth aspect of the present disclosure, there is provided computer program comprising instructions which, when the program is executed by a computer, cause the computer to carry out the method of any of the herein discussed embodiments.

Further embodiments of, and effects obtained through this fifth aspect of the present disclosure are largely analogous to those described above for the other aspects of the disclosure.

A computer program product is further provided including a computer readable storage medium storing the computer program. The computer readable storage medium may for example be non-transitory, and be provided as e.g., a hard disk drive (HDD), solid state drive (SDD), USB flash drive, SD card, CD/DVD, and/or as any other storage medium capable of non-transitory storage of data.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

Figure 1A:
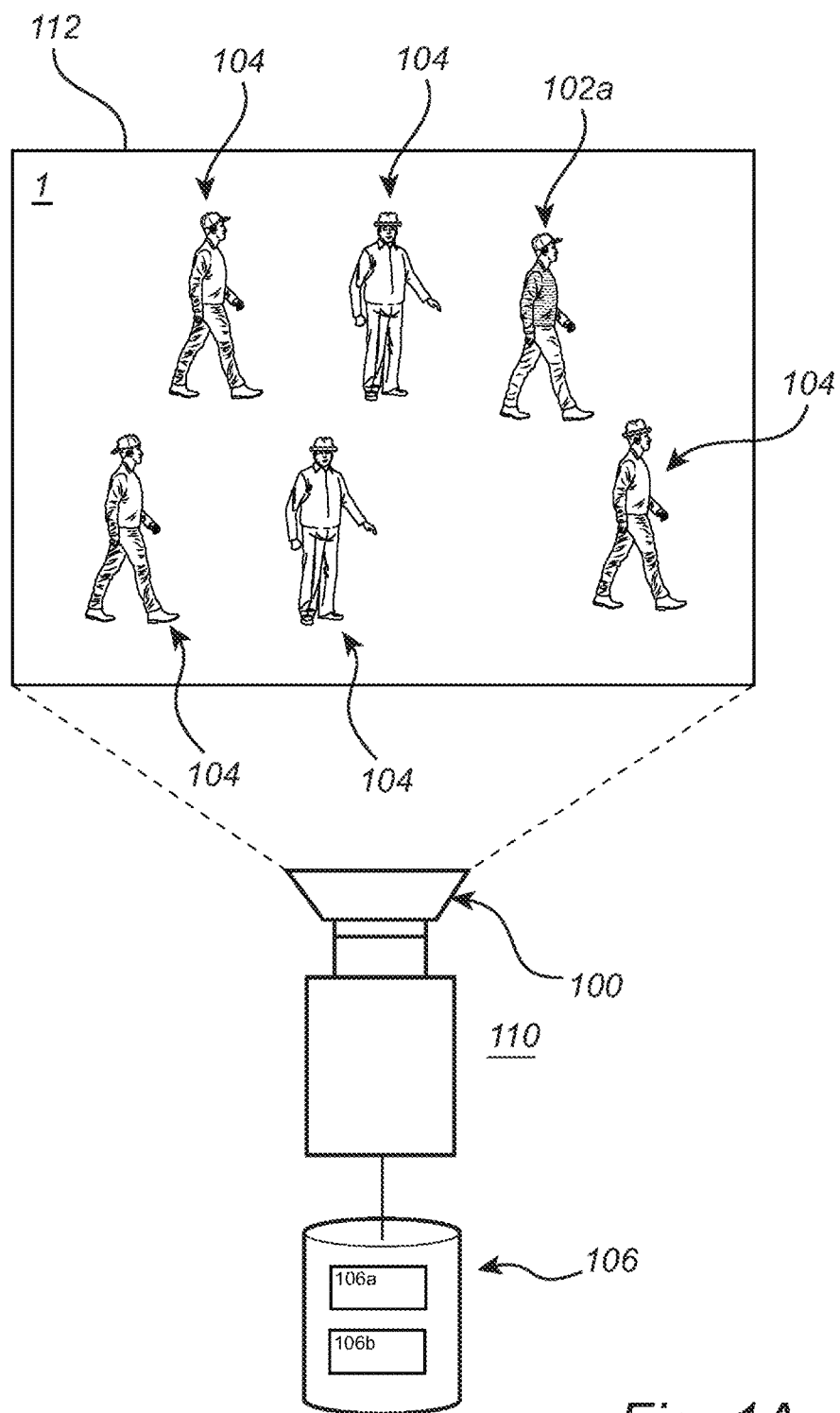
FIG. 1A conceptually illustrates a first instance of a scene being monitored by an image capturing device as an example application of embodiments of the disclosure.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled person. Like reference characters refer to like elements throughout.

Figure 1B:
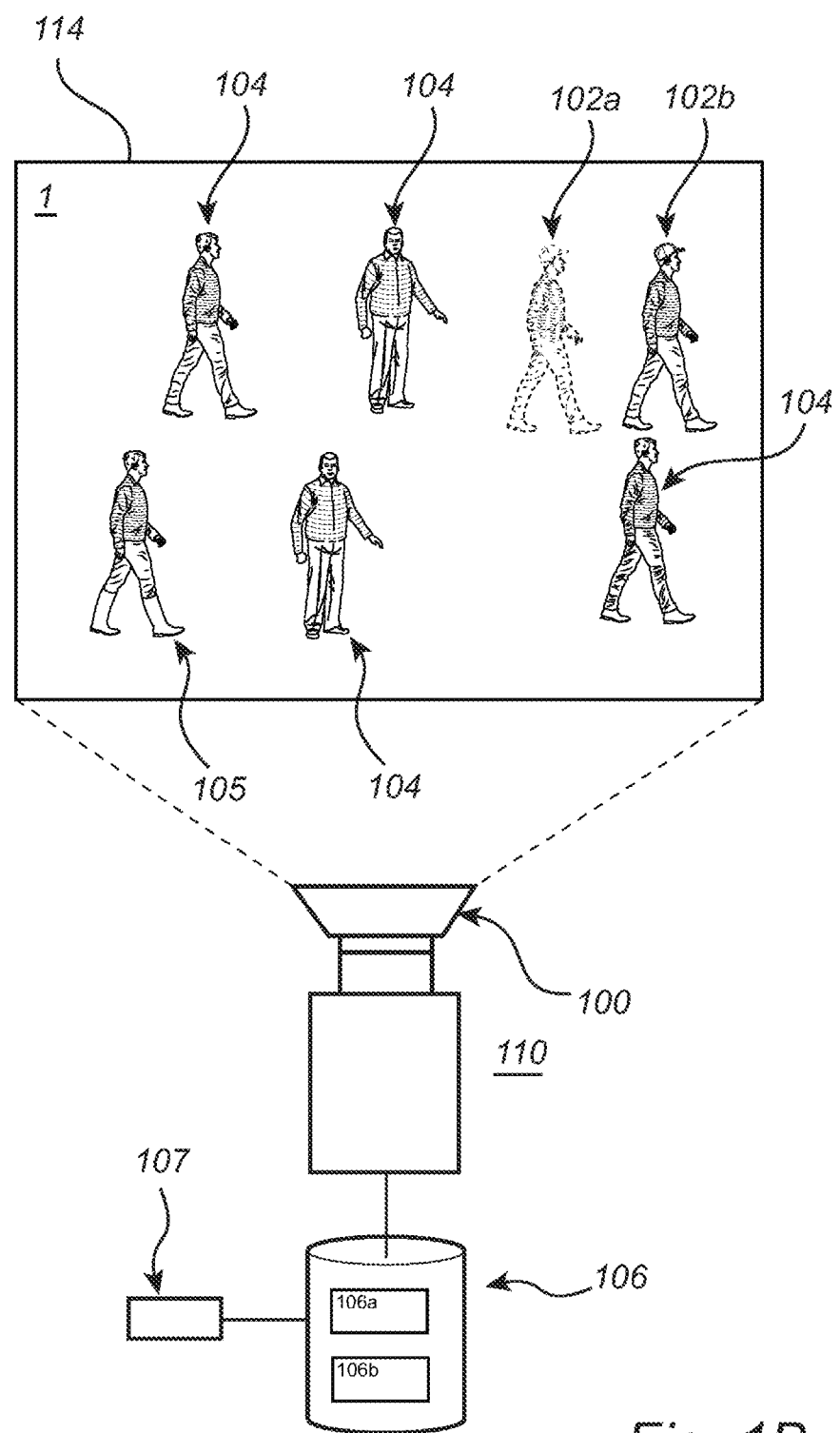
FIG. 1B conceptually illustrates a second instance of the scene being monitored by an image capturing device as an example application of embodiments of the disclosure.

Turning now to the drawings and to FIGS. 1A-B in particular, there is shown a scene 1 being monitored by an image capturing device 100, e.g., a camera or more specifically a surveillance camera. In the scene 1, there is a set of objects 102a-b, and 104, here exemplified as people present in the scene.

The camera 100 is continuously monitoring the scene 1 by capturing a video stream of images of the scene 1 and the objects 102, 104 therein. The camera 100 and a control unit 106 are part of a system 110, where the control unit 106 may either be a separate stand-alone control unit or be part of the camera 100. It is also conceivable that the control unit 106 is remotely located such as on a server and thus operates as a Cloud-based service.

The camera 100 may be mounted on a building, on a pole, or in any other suitable position depending on the specific application at hand. Further the camera 100 may be a fixed camera or a movable camera such as pan, tilt and zoom, or even a body worn camera. Further, the camera 100 may be a visible light camera, an infrared (IR) sensitive camera or a thermal (long-wavelength infrared (LWIR)) camera. Further, image acquisition devices employing LIDAR and radar functionalities may also be conceivable. It is also envisaged that the camera 100 is a combination of the mentioned camera technologies.

The captured instance in FIG. 1A may be considered a first frame 112 and the captured instance in FIG. 1B may be considered a second frame 114. The first and second frames may also be referred to as first and second image frames. Preferably, the video stream is captured by a camera 100 configured to monitor a single scene.

Turning now specifically to FIG. 1A, wherein the objects are illustrated as people, there is among the people 102a, 104 within the field of view of the camera 100, a set of people 104 all wearing plain patterned clothes, and one person 102a wearing a striped sweatshirt. In this simplified scene 1, if person 102a is to be distinguished and tracked, it is advantageous to use the striped sweatshirt as a contrasting trait. Note that this is only a simplified example used for clarity and understanding of embodiments herein.

The striped sweatshirt of person 102a is easily distinguishable from the rest of the objects, i.e., the other persons 104, in the scene 1 since, in this context, no one else is wearing a striped sweatshirt. In other words, for tracking the person 102a, it would be advantageous to continuously track the striped sweatshirt, instead of the common plain shirts or sweatshirts of the other persons 104. As a further example, it would not be advantageous to track prison clothing at a prison or the general sportswear at a sport practice since they are common to the respective scene. Instead, the contrasting traits are more easily tracked.

Accordingly, in this scene 1 shown in FIG. 1A, as long as the employed re-identification algorithm is trained to detect striped shirts and that striped shirts are not commonplace for the scene, tracking the person 102a may work as expected.

However, as the scene is changing and striped sweatshirts are becoming very common as shown in FIG. 1B, they may not provide a sufficient contrast for accurate tracking. To alleviate this problem, adaptive object tracking methods are employed to the local surroundings, or more specifically to the other objects, i.e., the other persons 104, of the scene. For example, as striped sweatshirts become more common, the proposed method weights other features higher than the features common in the scene 1. In FIG. 1B, the person 102b is wearing a hat which is a contrast to the other persons 104. In other words, since the hat feature deviates from the other objects 104 in the scene as a whole, the herein proposed methods will weight this feature higher than other more common features when tracking the person 102a-b. In other words, the method adapts to the other objects in the scene that define the present context thereof for tracking an object.

In a similar way, if a new object 105 is detected as shown in FIG. 1B, the method detects any contrasting features that can distinguish the new object 105 from the other detected features in the scene 1. Here, the new object, being a person 105, is wearing boots which is a deviation from the features of the other detectable objects 104, 102b in the scene 1 that are considered commonplace. A reference model is constructed for the specific scene to provide a representation of the commonplace traits for that scene, e.g., to provide a representation of the objects detected in the scene, and is typically generated using object detections over a predetermined time period for generating an accurate model. That reference model, or several reference models, is/are later used for acquiring one or more reference feature vectors.

Embodiments of the present disclosure will now be described in more detail with reference to subsequent drawings.

For re-identification, subsequent feature vectors are compared, and if they are sufficiently similar the corresponding objects are considered the same. For example, a first feature vector of the person 102a at a first instance, e.g., at a first detection in the first image frame 112, in FIG. 1A, may be compared to the feature vector of the person 102b at the second instance, e.g., at a second detection in the second image frame 114, shown in FIG. 1B. If they are similar according to a similarity measure, the detections of person 102a-b are considered to belong to the same person, whereby person 102b can be re-identified as being the same as the person 102a.

Figure 1C:
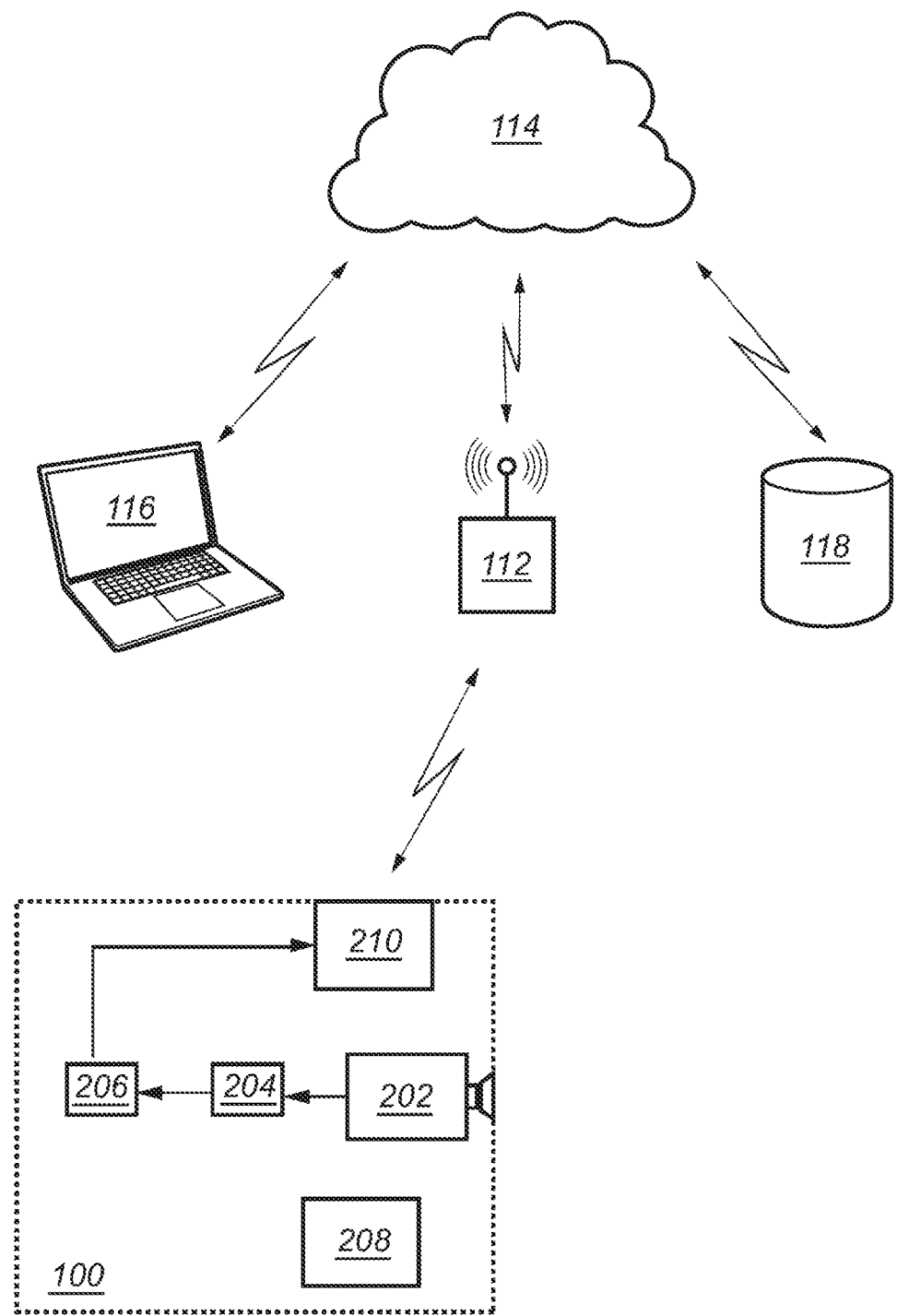
FIG. 1C is a conceptual view of an image capturing device according to embodiments of the disclosure.

FIG. 1C is a more detailed conceptual view of the camera 100 that further comprises an image capturing module 202, an image processing pipeline 204, an encoder 206, a data storage 208, and an input and output interface 210 configured as a communication interface between the camera 100 and the network 114 via the radio link 112.

The image capturing module 202 comprises various components such as a lens and an image sensor, where the lens is adapted to project an image onto the image sensor comprising multiple pixels.

The image processing pipeline 204 is configured to perform a range of various operations on image frames received from the image sensor. Such operations may include filtering, demosaicing, color correction, noise filtering for eliminating spatial and/or temporal noise, distortion correction for eliminating effects of e.g., barrel distortion, global and/or local tone mapping, e.g., enabling imaging of scenes containing a wide range of intensities, transformation, e.g., rotation, flat-field correction, e.g., for removal of the effects of vignetting, application of overlays, e.g., privacy masks, explanatory text, etc. However, it should be noted that some of these operations, e.g., transformation operations, such as correction of barrel distortion, rotation, etc., may be performed by one or more modules, components or circuits arranged outside the image processing pipeline 204, for example in one or more units between the image processing pipeline 204 and the encoder 206.

Following the image processing pipeline 204, the image frames are forwarded to the encoder 206, in which the image frames are encoded according to an encoding protocol and forwarded to a receiver, e.g., the client 116 and/or the server 118, over the network 114 using the input/output interface 210. It should be noted that the camera 100 illustrated in FIG. 1 also includes numerous other components, such as processors, memories, etc., which are common in conventional camera systems and whose purpose and operations are well known to those having ordinary skill in the art. Such components have been omitted from the illustration and description of FIG. 1 for clarity reasons.

The camera 100 may also comprise the data storage 208 for storing data relating to the capturing of the video stream. Thus, the data storage may store the captured video stream. The data storage may be a non-volatile memory, such as an SD card.

There are a number of conventional video encoding formats. Some common video encoding formats that work with the various embodiments of the present disclosure include: JPEG, Motion JPEG (MJPEG), High Efficiency Video Coding (HEVC), also known as H.265 and MPEG-H Part 2; Advanced Video Coding (AVC), also known as H.264 and MPEG-4 Part 10; Versatile Video Coding (VVC), also known as H.266, MPEG-I Part 3 and Future Video Coding (FVC); VP9, VP10 and AOMedia Video 1 (AV1), just to give some examples.

Generally, the control unit 106 operates algorithms for object detection and for determining feature vectors of detected objects. For example, the control unit 106 may comprise an object detector 106a configured to detect objects in images and a feature vector extractor 106b configured to extract feature vectors of detected objects. The object detector 106a may detect objects in inputted images and crop an image around a detected object. The cropped images may be inputted to the feature vector extractor 106b that is configured to extract feature vectors for each detected object. The one or more algorithms operated by the control unit 106 may be selected from a range of algorithms configured to perform object detection and feature extraction including convolutional neural networks (CNNs), recurrent neural networks, decision tree classifiers such as random forest classifiers that are also efficient for classification. An example of a CNN is a faster R-CNN (region-based convolutional neural network) that is a deep convolutional network used for object detection. The faster R-CNN may be a single, end-to-end, unified network for object detection. The faster R-CNN can accurately and quickly predict the locations of different objects. The faster R-CNN may be used as an object detector and a VGG16 may be used as a feature vector extractor. VGG16 is a CNN used for image recognition that can extract and output a feature vector for an object. In addition, classifiers such as support vector machine classifiers and logistic regression classifiers are also conceivable. The algorithms for object detection and for determining feature vectors of detected objects may run downstream of the image processing pipeline 204. However, it is envisaged that the algorithms run within the image processing pipeline 204 or even upstream of the image processing pipeline 204 depending on what type of image data the algorithm or algorithms have been trained on.

The control unit may operate the algorithm which may have been trained on annotated training data representing different classes of objects, for classifying features in the scene to belong to certain object classes according to its training. Each classification is provided with a location, e.g., coordinates in the image frame and a confidence value. The classification is typically performed downstream of the image processing pipeline 204 but upstream of the encoder 206, or even on the server 114. It is also possible to perform classification upstream of the image processing pipeline 204 depending on what type of image data the algorithm has been trained on.

Figure 2:
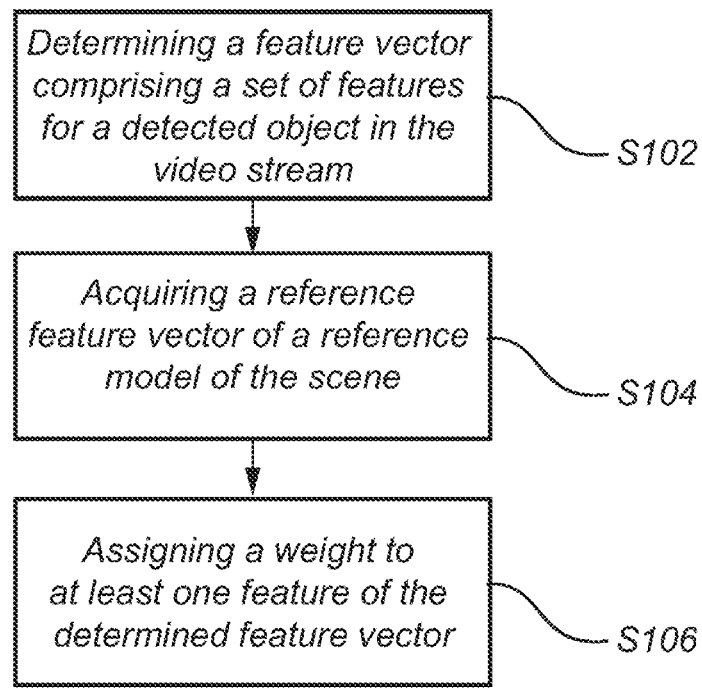
FIG. 2 is a flow-chart of method steps according to embodiments of the disclosure.

FIG. 2 is a flow-chart of method steps according to embodiments of the present disclosure. The method is for weighting of features in a feature vector of an object detected in a video stream capturing a scene 1. The video stream is acquired by an image acquisition device 100 of the system 110.

In step S102, determining a feature vector comprising a set of features for a detected object 102 in the video stream. The number of features in a feature vector is often in the range of 100-1000 and may be fixed for each use case. A feature is a trait or detail that a detection algorithm is trained to detect. Determining the feature vector may be executed by the control unit 106 connected to the image acquisition device 100 to receive the image frames of the video stream.

Figure 3A:
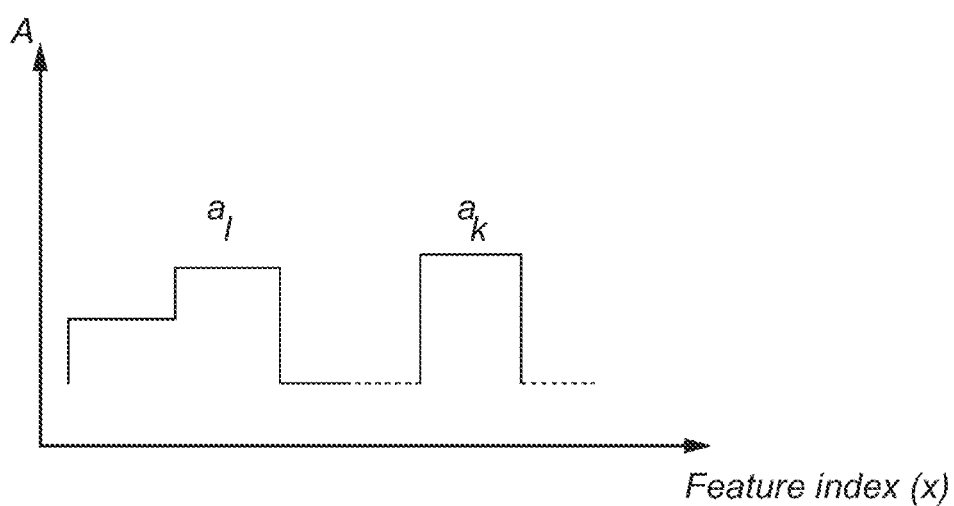
FIG. 3A is a conceptual illustration of a feature vector of a detected object.

An example plot of a feature vector A(x) is shown in FIG. 3A, where the vector A is represented by:

$$A=[a_2,a_3,a_4,a_5\ldots,a_x\ldots,a_n] \quad \text{Equation 1}$$

The feature vector comprises n feature indices x. Purely as a simplified example, the feature, a1-an, may represent e.g., "striped shirt", "suit", "hat", "sneakers", "boots", "hair color", "color of socks" etc., i.e., any features that may be used in recognizing an individual or an object. The vector instances a1-an are numeric values. But in practice the meaning of a features is something e.g., a convolutional neural network has learned implicitly and is typically not possible to concretely describe.

A reference feature vector of a reference model of the scene 1 is acquired in step S104. The reference feature vector comprises a collective feature vector calculated from all or some of multiple reference feature vectors of the reference model. The reference model may thus be a reference feature vector representative of multiple detections from a plurality of detected objects, or even all detections, made by the system 110 from the scene 1 when constructing the reference model. The reference feature vector may be generated or determined by the control unit 106 by detections made in the image frames of a video stream of the scene and is typically pre-constructed prior to entering the method step S102. Preferably, the collective feature vector is updated for subsequent or consecutive time durations to thereby alter the reference model as objects in the scene are replaced. For example, one reference model may be applicable for a first time duration where a first object collection is expected and a second reference model may be applicable for a second time duration where second object collection is expected different from the first object collection. The second reference model may be a new reference model, or it may be an updated first reference model. In other possible implementations, the control unit 106 receives the reference feature vector from another detection circuitry or module 107 adapted for continuously updating the reference model and provide updated reference feature vectors to the control unit 106.

With reference to the example illustrated in FIGS. 1A-B, the reference feature vector may comprise information about features detected from a plurality of the objects 102a-b, 104 and 105, and where the reference feature vector provides a representation of the general appearance of objects in the scene 1 for a given time duration. The reference model may include a collective median feature vector of all the observed objects along with the variation for each feature.

Figure 3B:
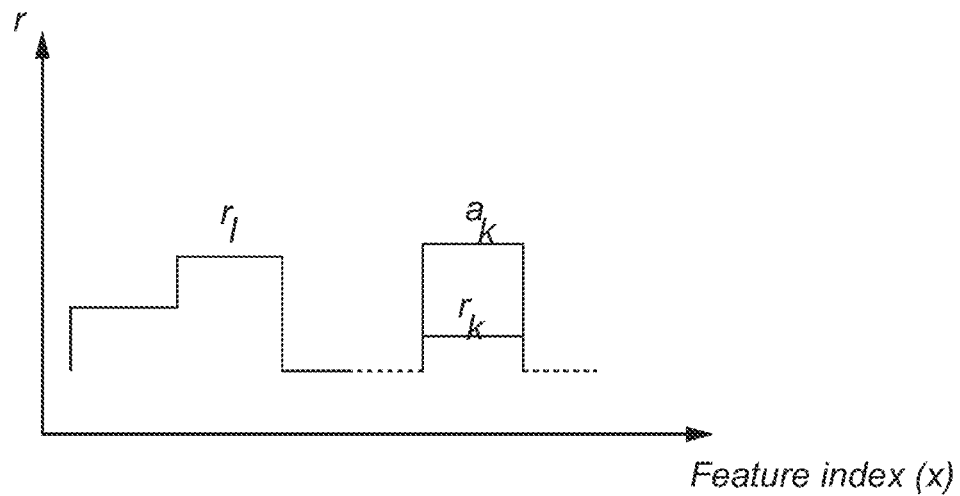
FIG. 3B is a conceptual illustration of a reference feature vector.

An example plot of a reference feature vector r(x) is shown in FIG. 3B, where the vector r is represented by:

$$r=[r_1,r_2,r_3,r_4,r_5\ldots,r_x\ldots,r_n] \quad \text{Equation 2.}$$

The reference feature vector comprises n feature indices analogously with the above feature vector A.

Corresponding features ak and rk are indicated in the feature vector A and in the reference feature vector. The feature ak of the feature vector A of the detected object is better distinguished from the corresponding feature rk of reference feature vector r compared to the other features of vector A that lie close to their corresponding reference features of vector r. The feature ak of the feature vector A is indicated also in FIG. 3B.

Subsequently, assigning a weight to at least one, or preferably to each of the features of the determined feature vector in step S106. Thus, it is preferred that all features of the determined feature vector are assigned a respective weight, stated otherwise, one weight is assigned per feature. The weight for a feature of the determined feature vector, A, depends on a deviation measure, e.g., a standard deviation measure, indicative of a degree of deviation of the feature from a corresponding feature of the acquired reference feature vector, r, of the reference model. For example, the weight of a specific feature in the determined feature vector, A, could be a value between 0 and 1, wherein a value of 0 or close to 0 is set to features that are similar to features of the reference vector and a value of 1 or close to 1 is set to features that deviate the most from the features of the reference vector. As another example, the weight of a specific feature in the determined feature vector, A, could be equal to the number of standard deviations its value is from the mean value of the corresponding feature in the reference feature vector, r. All weights assigned the determined feature vector may then be normalized in such a way that their sum is equal to one. As another deviation measure, the variance may be used.

The acquired reference feature vector may be an average of multiple reference feature vectors of the reference model along with the variance. This average reference feature vector may be the average of all or some of the reference feature vectors of the reference model.

Further, it may be possible to form two or more different reference feature vectors from the reference model. Two different reference feature vectors may represent two different types of objects in the scene having different distinguishing features from the rest of the scene. The types of the objects may be different types of objects of the same object class. For example, the object class may be humans, and one type of humans may be men dressed in dark suits and the other type of human may be women dressed in dark dresses.

The deviation may be determined in different ways, but with the intention to provide a measure to what degree a feature of a feature vector of a detected object deviates from a corresponding feature of the reference feature vector representing a majority of the detected objects in the scene. For example, if a feature of a feature vector of a detected object deviates significantly from a corresponding feature of the reference feature vector having small variance, this feature may be provided a higher weight than if the variance of the corresponding feature of the reference feature vector is small. The deviation may be an absolute difference, e.g., subtraction between corresponding feature numeric values can be made. As a further example, a deviation may be a relative relationship between corresponding features, e.g., by considering the ratio between corresponding feature numeric values of the object feature vector and the reference feature vector.

By assigning weights to features of the feature vector A depending on how unique they are compared to features of the reference feature vector representing other objects in the scene, it is possible to adaptively enhance features that are presently unique in the scene for re-identification purposes.

Preferably, features in the determined feature vector with large deviations from the corresponding feature of the acquired reference feature vector are assigned higher weights than features in the determined feature vector with smaller deviations from the corresponding feature of the acquired reference feature vector. For example, the feature at ak which deviation from the corresponding reference feature at rk is relatively high is assigned a higher weight compared to the feature at al which deviates less from its corresponding feature rl.

An example weight vector w may be represented by:

$$w=[w_1,w_2,w_3,w_4,w_5,\ldots,w_x,\ldots,w_n] \quad \text{Equation 3}$$

The indices 1-n correspond to the indices of the feature vector A and B.

As further frames are collected by the image acquisition device 100, further detections are made resulting in feature vector accumulated over tracklets. Thus, feature vectors of detected objects are extracted at consecutive time steps corresponding to the image frames. By registering what features are similar across consecutive object instance observations and what features most often are different from the reference model, the weight vector can be created which will be robust with regard to e.g., temporary occlusions, image noise and other nuisances.

If the above determined feature vector is considered a first feature vector for the detected first object, and with regards to detecting features of the detected object that are similar between detections, the method may comprise determining at least one further feature vector comprising a set of features for the detected first object. The step of assigning then comprises assigning the weights to at least one feature of the determined first feature vector further depending on a degree of similarity with a corresponding feature of the determined at least one further feature vector. For example, if feature ak is similar to the corresponding feature of a consecutive further feature vector, then the weight wk is adapted. Preferably, the weight wk is increased as a result of the similarity. Thus, features with assigned weights that are persistent over subsequent or consecutive object detections are assigned higher weights than features that are less persistent over consecutive object detections. This further enhances the unique features of the detected object. For example, a weight for a feature of the determined feature vector, A, may depend on a deviation measure indicative of a degree of deviation of a rolling time average of the feature from a corresponding feature of the acquired reference feature vector, r, of the reference model.

Figure 4:
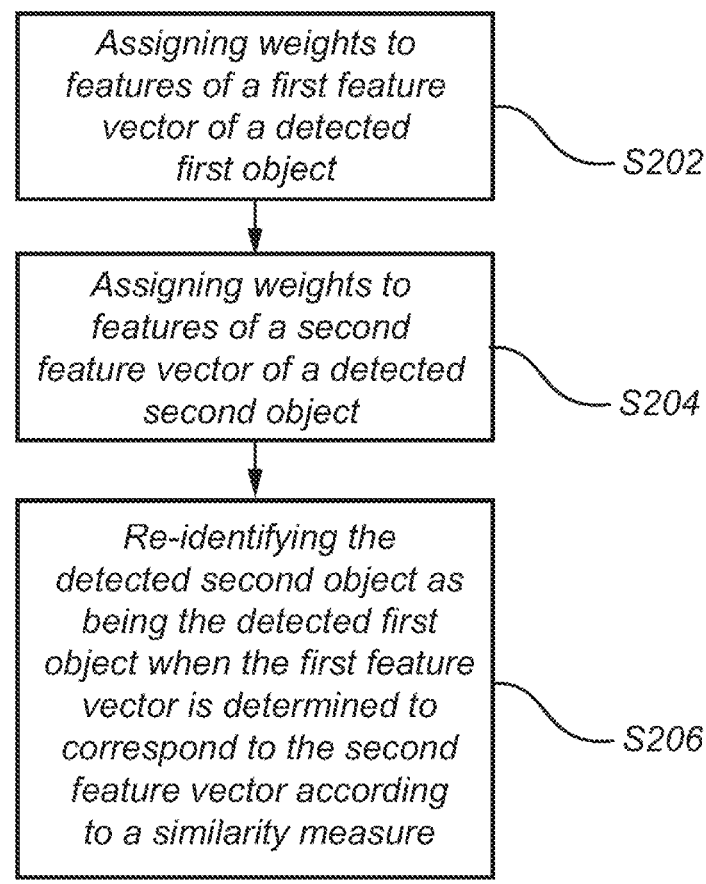
FIG. 4 is a flow-chart of method steps according to embodiments of the disclosure.

According to a further aspect of the disclosure, a method for performing re-identification of an object detected in a video stream capturing a scene is provided. The method steps are shown in the flow-chart of FIG. 4 which will be discussed also with reference to FIGS. 1A-B.

In step S202, assigning weights to features of a first feature vector of a detected first object 102a using the method described with reference to the flow-chart of FIG. 2 and embodiments thereof.

In step S204, assigning weights to features of a second feature vector of a detected second object 102b using the method described with reference to the flow-chart of FIG. 2 and embodiments thereof.

Step S202 and S204 may be performed simultaneously as a single step so that the same weights are assigned to the first feature vector and to the second feature vector.

Subsequently, re-identifying the detected second object 102b as being the detected first object 102a when the first feature vector is determined to correspond to the second feature vector according to a similarity measure between the first and second feature vector. The similarity measure is calculated using the assigned weights so that features with higher weights are emphasized more than features with lower weights as will be exemplified in more detail below.

Figure 3C:
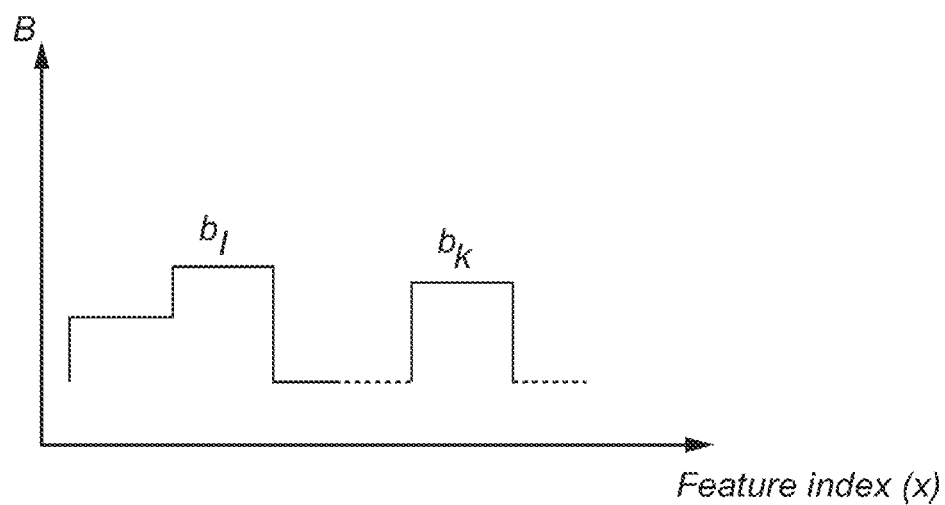
FIG. 3C is a conceptual illustration of a feature vector of a detected object.

The second feature vector B is conceptually represented in FIG. 3C. As with the first feature vector A, the feature bk is distinguished from the reference feature vector r. The feature vector B is represented by:

$$B=[b_1,b_2,b_3,b_4,b_5,\ldots,b_x,\ldots,b_n] \quad \text{Equation 4}$$

With the proposed method, when feature vectors are compared the feature vectors B and A are fed into a metric function that also receive the corresponding weight vectors. The metric function is configured to emphasize the features that distinguished the two objects from the acquired reference feature vector. In the presently discussed example, the similarity measure would emphasize the feature bk more than other features such as feature bl which is similar to the corresponding feature rl in the reference model shown in FIG. 3B.

In possible implementations, with a single camera and scene, the control unit 106 is configured to determine the first feature vector A and the second feature vector B, and to calculate and assign weights to both feature vectors A and B using a single reference model. The control unit 106 is configured to calculate the similarity measure and to re-identify the detected second object 102b as being the detected first object 102a when the first feature vector is determined to correspond to the second feature vector according to the similarity measure.

Preferably, the same weights w are assigned to features of the first feature vector A and to the corresponding features of the second feature vector B. The weights being determined from an evaluation of the weights assigned to the first feature vector and the weights assigned to the second feature vector.

Firstly, the deviation of the first feature vector from the reference feature vector and a deviation of the second feature vector from the reference feature vector may be determined.

Based on these deviations a common weight vector w is assigned. For example, the common weight vector may be determined from the average deviations of the feature vectors from the reference feature vector. As a further example, the common weight vector may be determined using the feature vector of the two feature vectors that deviates the most from the reference feature vector.

A single common weight vector is advantageous because it makes the calculation of the similarity measure in the metric function more straight forward without the need for re-scaling weights and/or feature vectors.

When the feature vectors A and B and the corresponding weights are established, they are fed into the metric function for determining a similarity measure. As an example, the metric function may be given by:

$$d(A,B) = \sqrt{\Sigma_i |a_i - b_i|^{w_i}}$$ Equation 5

Here, d is the similarity measure, A and B are the feature vectors comprising features $a_i$, and $b_i$, and $w_i$, is the common weight vector. If a similarity measure, d, is less than a threshold, two object detections are of the same object and re-identification may be performed. In case the similarity measure is a Euclidean distance, the threshold could be any positive value. However, if the similarity measure is the Euclidean distance and the feature vectors are normalized to 1, then the threshold is 2. If the similarity measure is a cosine similarity, then the threshold is a value between −1 and 1. Note that a feature ai and bi, is herein represented by a numeric value from the respective feature vector. The above metric function d(A, B) is plotted in FIG. 5 for two different weights, w=1 and w=3 as function of deviation between features, $|a_i - b_i|$. As can be concluded from the graph in FIG. 5, the above metric function d(A, B) has the preferred characteristics that for a weight wi larger than 1, small deviations between corresponding features (values for that index, i) are suppressed, leading to that the detected objects appear more similar, whereas larger deviations between corresponding features values for an index, k, are enhanced further, making the detected objects appear more dissimilar. Thus, the larger deviation feature gets more discriminating power than other features.

In some cases, a single image acquisition device is used and re-identification for object tracking is performed on the video stream of the single monitored scene as discussed above. In other cases, more than one image acquisition device is used and re-identification for object tracking is performed using more than one video stream.

Figure 5:
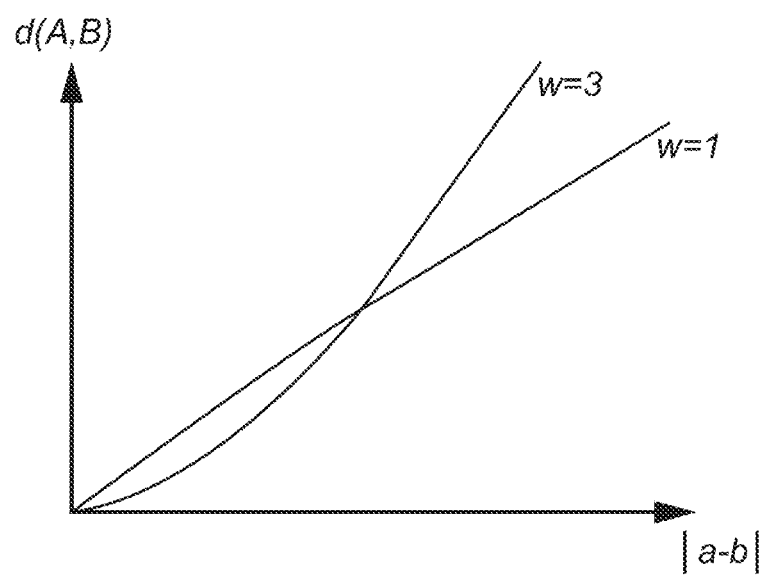
FIG. 5 is a graph conceptually representing a similarity measure function.
Figure 6:
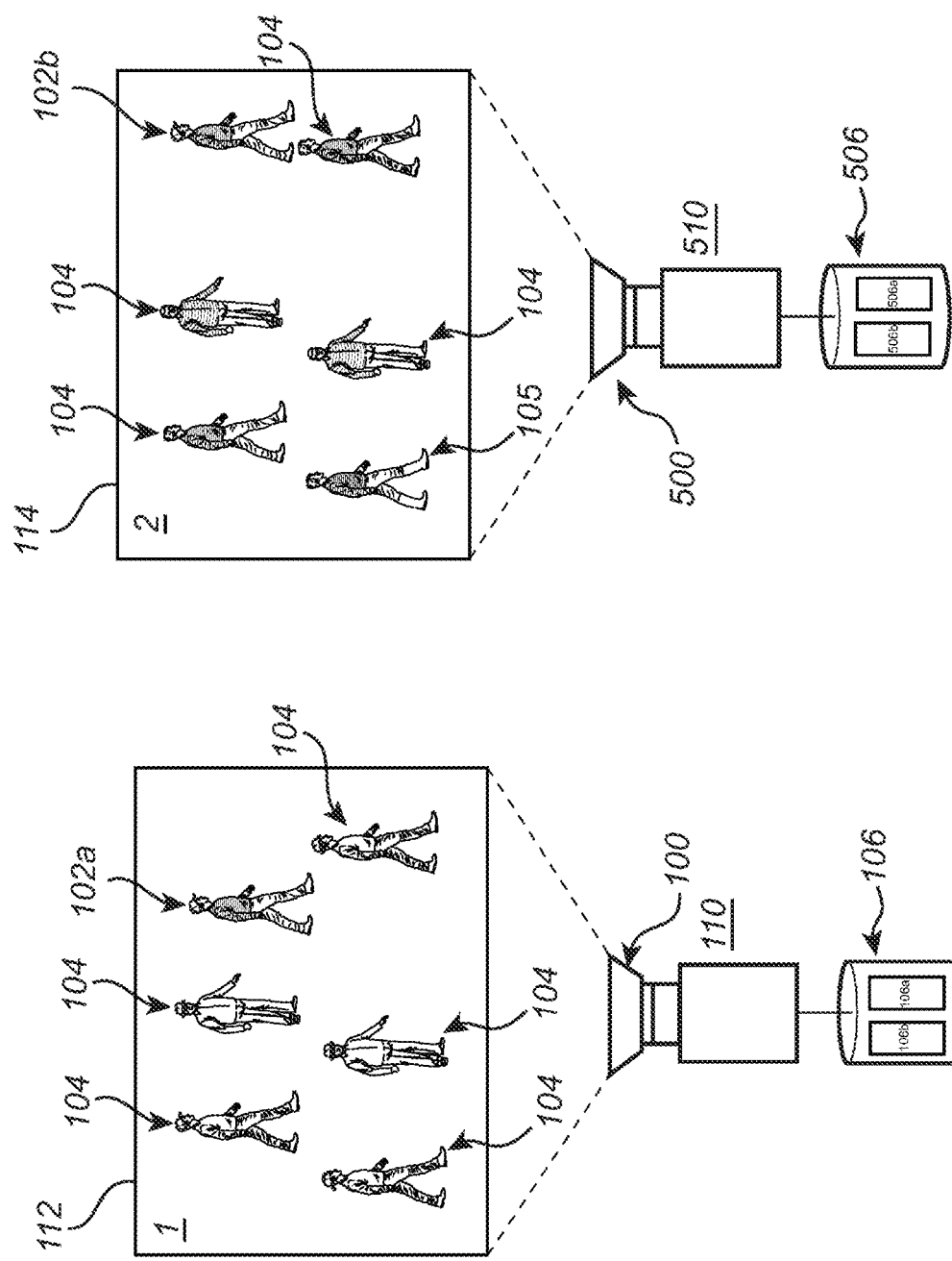
FIG. 6 conceptually illustrates use of two image acquisition devices monitoring different scenes according to embodiments of the disclosure.

Turning to FIG. 5 conceptually illustrating two scenes 1 and 2, and image acquisition devices 100 and 500 included in a respective system 110, 510 comprising a respective control unit 106 and 506. As the control unit 106, the control unit 506 may comprise an object detector 506a and a feature vector extractor 506b. The two image acquisition devices 100 and 500 are monitoring two different scenes 1 and 2. With regards to re-identification between the two scenes, for example when the object 102a moves between the two scenes 1 and 2, two different reference models are used. More specifically, the weights for the first feature vector of the detected first object 102a is generated by the control unit 106 using a first reference model. Further, the weights for the second feature vector of the detected second object 102b is generated by the control unit 506 using a second reference model. It is conceivable that the two image acquisition devices 100 and 500 are connected to a common single control unit that is configured to calculate the feature vectors and the weights, and to perform the re-identification.

It is also possible to use two different reference models for a single image acquisition device, for example where different parts of the field of view have different light, or shadowing effects that affect the reference feature vectors of the reference model. Different light and shadowing effects can affect the reference feature vectors since the appearance of the objects on which the reference feature vectors have been built upon will change with different light and shadowing effects and consequently the feature vectors for those objects will differ from feature vectors extracted for the same objects during another light and/or shadowing condition.

When more than one image acquisition device is used and where more than one scene is monitored, there are several advantageous ways to form reference models.

In one possible implementation, the weights assigned to a feature of the first feature vector and to a corresponding feature of the second feature vector depend on the feature of the first feature vector and the feature of the second feature vector that deviates most from the respective acquired reference feature vector. In other words, a first reference feature vector r as described above is associated with scene 1 and a second reference feature vector r2 is associated with scene 2. Overall, reference feature vectors r and r2 may be represented by:

$$r = [r_1, r_2, r_3, r_4, r_5, \ldots, r_n]$$ Equation 6

$$r2 = [r2_1, r2_2, r2_3, r2_4, r2_5, \ldots, r2_n]$$ Equation 7

If a feature of the first feature vector determined from scene 1 deviates from the reference feature vector r more than the deviation of the corresponding feature of the second feature vector from the second reference feature vector r2, then the larger of the deviation precedes whereby a weight is assigned to both the features of the first and second feature based on the larger deviation.

In a further possible implementation, the weights assigned to a feature of the first feature vector and to a corresponding feature of the second feature vector depend on the deviation of the feature of the first feature vector and the feature of the second feature vector that deviates the least from the respective acquired reference feature vector. If a feature of the first feature vector determined from scene 1 deviates from the reference feature vector r more than the deviation of the corresponding feature of the second feature vector from the second reference feature vector r2, then the smaller of the deviations, in contrast to the larger deviation as described above, precedes whereby a weight is assigned to both the features of the first and second feature based on the smaller deviation. In other words, in order for a large weight to be assigned it is required that both corresponding features deviate to some relatively high degree from their corresponding reference models. For example, the feature related to "boots" of the person 105 in the second scene would be assigned lower weights than striped sweatshirts of the object 102a-b which is present in both scenes 1 and 2. This provides for excluding, by means of the assigned weights that the object 105 was also present in scene 1.

In some possible implementations, the method for re-identifying may comprise determining a first similarity measure using a first reference model r, and a second similarity measure r2 using a second reference model. In other words, two separate similarity measures are determined independently of each other using two different reference models. Re-identifying may then comprise determining that the second object corresponds to the first object if any one of the first similarity measure and the second similarity measure indicates that the first feature vector corresponds to the second feature vector.

There is further provided a computer program comprising instructions which, when the program is executed by a computer, cause the computer to carry out the method of any one of the herein disclosed embodiments. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical, or solid-state type. Still within the scope of "data carrier", such memories may be fixedly mounted or portable.

For example, the instructions comprising code for determining a feature vector comprising a set of features for a detected object in the video stream; and code for assigning a weight to at least one, or preferably each feature of the determined feature vector, wherein the weight for a feature of the determined feature vector depends on a deviation measure indicative of a degree of deviation of the feature from a corresponding feature of an acquired reference feature vector of a reference model of the scene.

Further, instruction of another embodiment may include code for assigning weights to features of a first feature vector of a detected first object; code for assigning weights to features of a second feature vector of a detected second object; and code for re-identifying the detected second object as being the detected first object when the first feature vector is determined to correspond to the second feature vector according to a similarity measure between the first and second feature vector, the similarity measure is calculated using the assigned weights so that features with higher weights are emphasized more than features with lower weights.

The control unit includes a microprocessor, microcontrol unit, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontrol unit or programmable digital signal processor mentioned above, the processor may further include computer executable code that controls operation of the programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

EMBODIMENTS

Embodiment 1. A method for weighting of features in a feature vector of an object detected in a video stream capturing a scene (1), comprising:
 determining (S102) a feature vector (A, B) comprising a set of features for a detected object (102a; 102b) in the video stream;
 acquiring (S104) a reference feature vector (r) of a reference model of the scene; and
 assigning (S106) a weight (w) to at least one feature of the determined feature vector, wherein the weight for a feature of the determined feature vector depends on a deviation measure indicative of a degree of deviation of the feature from a corresponding feature of the acquired reference feature vector of the reference model.

Embodiment 2. The method according to Embodiment 1, wherein features in the determined feature vector with large deviations from the corresponding feature of the acquired reference feature vector are assigned higher weights than features in the determined feature vector with smaller deviations from the corresponding feature of the acquired reference feature vector.

Embodiment 3. The method according to any one of the preceding Embodiment, wherein the acquired reference feature is a collective feature vector calculated from all or some of multiple reference feature vectors of the reference model.

Embodiment 4. The method according to Embodiment 3, wherein the collective feature vector represents multiple detected objects during a time duration, where the collective feature vector is updated for subsequent time durations.

Embodiment 5. The method according to any one of the preceding Embodiment, wherein the determined feature vector is a first feature vector for the detected first object, the method further comprises:

determining at least one further feature vector comprising a set of features for the detected first object, wherein the step of assigning comprises:
assigning the weights to at least one feature of the determined first feature vector further depending on a degree of similarity with a corresponding feature of the determined at least one further feature vector.

Embodiment 6. The method according to Embodiment 5, wherein features with assigned weights that are persistent over consecutive object detections are assigned higher weights than features that are less persistent over subsequent object detections.

Embodiment 7. The method according to any one of the preceding Embodiments, wherein the video stream is captured by an image acquisition device configured to monitor a single scene.

Embodiment 8. A method for performing re-identification of an object detected in a video stream capturing a scene, the method comprising:
assigning (S202) weights to features of a first feature vector of a detected first object using the method according to any one of the preceding Embodiments;
assigning (S204) weights to features of a second feature vector of a detected second object using the method according to any one of the preceding Embodiments;
re-identifying (S206) the detected second object as being the detected first object when the first feature vector is determined to correspond to the second feature vector according to a similarity measure between the first and second feature vector, the similarity measure is calculated using the assigned weights so that features with higher weights are emphasized more than features with lower weights.

Embodiment 9. The method according to Embodiment 8, comprising assigning the same weights to features of the first feature vector and to corresponding features of the second feature vector, the weights being determined from an evaluation of the weights assigned to the first feature vector and the weights assigned to the second feature vector.

Embodiment 10. The method according to any one of Embodiments 8 and 9, wherein the weights for the first feature vector of the detected first object is generated using a first reference model, and the weights for the second feature vector of the detected second object is generated using a second reference model.

Embodiment 11. The method according to Embodiment 10, wherein the weights assigned to a feature of the first feature vector and to a corresponding feature of the second feature vector depend on the feature of the first feature vector and the feature of the second feature vector that deviates most from the respective acquired reference feature vector.

Embodiment 12. The method according to Embodiment 10, wherein the weights assigned to a feature of the first feature vector and to a corresponding feature of the second feature vector depend on the deviation from the acquired reference feature vector of the feature of the first feature vector and the feature of the second feature vector that deviates the least from the respective acquired reference feature vector.

Embodiment 13. The method according to Embodiment 10, comprising determining a first similarity measure using the first reference model, and a second similarity measure using the second reference model, wherein re-identifying comprises:
determining that the second object corresponds to the first object if any one of the first similarity measure and the second similarity measure indicates that the first feature vector corresponds to the second feature vector.

Embodiment 14. A control unit (106) configured to execute the steps of the method according to anyone of the preceding Embodiments.

Embodiment 15. A system (110) comprising a control unit according to Embodiment 14, and an image acquisition device for capturing images of a scene (1) including objects (102a-b, 105, 104).

Embodiment 16. A method for performing re-identification of an object detected in at least one video stream of image frames capturing at least one scene (1, 2), the method comprising:
determining (S102), by a control unit (106) operating algorithms for object detection and for determining feature vectors of detected objects, a first numerical feature vector (A) comprising a set of numerical features for a detected first object (102a) in a first image frame (112) capturing a respective one scene of the at least one scene (1, 2);
determining (S102), by the control unit (106), a second numerical feature vector (B) comprising a set of numerical features for a detected second object (102a; 102b) in a second image frame (114) capturing a respective one scene of the at least one scene (1, 2);
acquiring (S104), by the control unit (106), an average or median numerical reference feature vector (r, r2) calculated from all or some of multiple reference feature vectors of a reference model for a respective one of the at least one scene (1, 2), wherein the reference model is generated using object detections made in image frames over a time period preceding the determining (S102) of the first and second numerical feature vectors (A, B), wherein the reference model is applicable for a first time duration where a first object collection is expected in the scene (1, 2), and wherein the average or median numerical reference feature vector (r, r2) is updated for subsequent time durations and applicable for a second time duration where a second object collection different from the first object collection is expected; and by the control unit (106):
comparing each numerical feature of the determined first numerical feature vector (A) and of the determined second feature vector (B) with a corresponding numerical feature of the numerical reference feature vector (r, r2) and assigning (S204) a weight (w) to at least one numerical feature of the determined first numerical feature vector (A) and of the determined numerical second feature vector (B), wherein the weight for a numerical feature of the determined first and second numerical feature vectors (A, B) depends on a deviation measure indicative of a degree of deviation of the numerical feature of the first and second numerical feature vectors (A, B) from a corresponding numerical feature of the acquired numerical reference feature vector (r, r2) of the reference model, wherein numerical features in the determined first and second numerical feature vectors (A, B) with larger deviations from the corresponding numerical feature of the acquired numerical reference feature vector (r, r2) are assigned higher weights than numerical features in the determined first and second numerical feature vectors (A) with smaller deviations from the corresponding numerical feature of the acquired numerical reference feature vector (r, r2), and
re-identifying (S206) the detected second object (102b) as being the detected first object (102a) when the first numerical feature vector (A) is determined to correspond to the second numerical feature vector (B) according to a similarity measure between the first and second numerical feature vectors (A, B) being less than a threshold, the similarity measure is calculated using the assigned weights so that features with higher weights are emphasized more than features with lower weights in the calculation of the similarity measure.

Embodiment 17. The method according to Embodiment 16, wherein the method further comprises:
determining at least one further numerical feature vector comprising a set of numerical features for the detected first person (102a), wherein the step of assigning comprises:
assigning the weights to at least one numerical feature of the determined first numerical feature vector (A) further depending on a degree of similarity with a corresponding numerical feature of the determined at least one further numerical feature vector.

Embodiment 18. The method according to Embodiment 17, wherein numerical features with assigned weights that are persistent over consecutive detections of the first person (102a) are assigned higher weights than numerical features that are less persistent over subsequent detections of the first person (102a).

Embodiment 19. The method according to any one of Embodiments 16-18, wherein the video stream is captured by an image acquisition device (100, 500) configured to monitor a single scene (1, 2).

Embodiment 20. The method according to any one of Embodiments 16-19, comprising assigning the same weights to numerical features of the first numerical feature vector (A) and to corresponding numerical features of the second numerical feature vector (B), the weights being determined from an evaluation of the weights assigned to the first numerical feature vector (A) and the weights assigned to the second numerical feature vector (B).

Embodiment 21. The method according to any one of Embodiments 16-20, wherein the weights for the first numerical feature vector (A) of the detected first person (102a) is generated using a first reference model, and the weights for the second numerical feature vector (B) of the detected second person (102b) is generated using a second reference model.

Embodiment 22. The method according to Embodiment 21, wherein the weights assigned to a numerical feature of the first numerical feature vector (A) and to a corresponding numerical feature of the second numerical feature vector (B) depend on the numerical feature of the first numerical feature vector (A) and the numerical feature of the second numerical feature vector (B) that deviates most from the respective acquired reference numerical feature vector (r, r2).

Embodiment 23. The method according to Embodiment 21, wherein the weights assigned to a feature of the first numerical feature vector (A) and to a corresponding numerical feature of the second numerical feature vector (B) depend on the deviation from the acquired numerical reference feature vector (r, r2) of the numerical feature of the first numerical feature vector (A) and the numerical feature of the second numerical feature vector (B) that deviates the least from the respective acquired numerical reference feature vector (r, r2).

Embodiment 24. The method according to Embodiment 21, comprising determining a first similarity measure using the first reference model, and a second similarity measure using the second reference model, wherein re-identifying comprises:
determining that the second object (102b) corresponds to the first object (102a) if any one of the first similarity measure and the second similarity measure is less than a threshold indicating that the first numerical feature vector (A) corresponds to the second numerical feature vector (B).

Embodiment 25. A control unit (106) configured to execute the steps of the method according to anyone of the preceding embodiments.

Embodiment 26. A system (110) comprising a control unit according to Embodiment 25, and an image acquisition device (100, 500) for capturing images of a scene (1, 2) including objects (102a-b, 105, 104).

The invention claimed is:
1. A method for performing re-identification of an object detected in at least one video stream capturing at least one scene, the method comprising:
determining, using a trained Convolutional Neural Network (CNN) algorithm for object detection and for determining feature vectors of detected objects, a first feature vector comprising a set of numerical features for a detected first object in a first image frame capturing one scene of the at least one scene;
determining, using the trained CNN algorithm, a second feature vector comprising a set of numerical features for a detected second object in a second image frame capturing the one scene of the at least one scene;
acquiring a reference feature vector calculated as an average or median feature vector of all or some of multiple feature vectors of a reference model of the one scene of the at least one scene, wherein the reference model is constructed to provide a representation of commonplace traits for the one scene of the at least one scene and is generated using object detections over a predetermined time period for generating an accurate model, and wherein the reference feature vector is pre-constructed prior to entering the determining steps;
assigning a weight to at least one numerical feature of the first feature vector, wherein the weight for a numerical feature of the first feature vector depends on a deviation measure indicative of a degree of deviation of the numerical feature of the first feature vector from a corresponding numerical feature of the acquired reference feature vector of the reference model, wherein numerical features of the first feature vector with larger deviations from the corresponding numerical feature of the reference feature vector are assigned higher weights than numerical features of the first feature vector with smaller deviations from the corresponding numerical feature of the reference feature vector;
assigning a weight to at least one numerical feature of the second feature vector, wherein the weight for a numerical feature of the second feature vector depends on a deviation measure indicative of a degree of deviation of the numerical feature of the second feature vector from a corresponding numerical feature of the reference feature vector of the reference model, wherein numerical features of the second feature vector with larger deviations from the corresponding numerical feature of the reference feature vector are assigned higher weights than numerical features of the second feature vector with smaller deviations from the corresponding numerical feature of the reference feature vector; and re-identifying the detected second object as being the detected first object when the first feature vector is determined to correspond to the second feature vector according to a similarity measure between the first and second feature vectors being less than a threshold, the similarity measure is calculated using the assigned weights so that numerical features with higher weights are emphasized more than numerical features with lower weights in the calculation of the similarity measure.

2. The method according to claim 1, wherein the method further comprises:
determining at least one further feature vector comprising a set of numerical features for the detected first object, wherein the step of assigning comprises:
assigning the weights to at least one numerical feature of the first feature vector further depending on a degree of similarity with a corresponding numerical feature of the determined at least one further feature vector.

3. The method according to claim 1, wherein the at least one video stream is captured by a respective image acquisition device configured to monitor a single scene.

4. The method according to claim 1, comprising assigning the same weights to numerical features of the first feature vector and to corresponding numerical features of the second feature vector, the weights being determined from an evaluation of the weights assigned to the first feature vector and the weights assigned to the second feature vector.

5. The method according to claim 1, wherein the weights for the first feature vector of the detected first object is generated using a first reference model, and the weights for the second feature vector of the detected second object is generated using a second reference model.

6. The method according to claim 5, wherein the weights assigned to a numerical feature of the first feature vector and to a corresponding numerical feature of the second feature vector depend on the numerical feature of the first feature vector and the numerical feature of the second feature vector that deviates most from the respective-acquired reference feature vector.

7. The method according to claim 5, wherein the weights assigned to a numerical feature of the first feature vector and to a corresponding numerical feature of the second feature vector depend on the deviation from the reference feature vector of the numerical feature of the first feature vector and the numerical feature of the second feature vector that deviates the least from the respective reference feature vector.

8. The method according to claim 5, comprising determining a first similarity measure using the first reference model, and a second similarity measure using the second reference model, wherein re-identifying comprises:
determining that the second object corresponds to the first object if any one of the first similarity measure and the second similarity measure is less than a threshold indicating that the first feature vector corresponds to the second feature vector.

9. An apparatus comprising a processor, the apparatus configured to execute the steps of a method for performing re-identification of an object detected in at least one video stream capturing at least one scene, the method comprising:
determining, using a trained Convolutional Neural Network (CNN) algorithm for object detection and for determining feature vectors of detected objects, a first feature vector comprising a set of numerical features for a detected first object in a first image frame capturing one scene of the at least one scene;
determining, using the trained CNN algorithm for object detection and for determining feature vectors of detected objects, a second feature vector comprising a set of numerical features for a detected second object in a second image frame capturing the one scene of the at least one scene;
acquiring a reference feature vector calculated as an average or median feature vector of all or some of multiple feature vectors of a reference model of a the one scene of the at least one scene, wherein the reference model is constructed to provide a representation of commonplace traits for the one scene of the at least one scene and is generated using object detections over a predetermined time period for generating an accurate model, and wherein the reference feature vector is pre-constructed prior to entering the determining steps;
assigning a weight to at least one numerical feature of the first feature vector, wherein the weight for a numerical feature of the first and second feature vector depends on a deviation measure indicative of a degree of deviation of the numerical feature of the first and second feature vector from a corresponding numerical feature of the reference feature vector of the reference model, wherein numerical features of the first feature vector with larger deviations from the corresponding numerical feature of the reference feature vector are assigned higher weights than numerical features of the first feature vector with smaller deviations from the corresponding numerical feature of the reference feature vector;
assigning a weight to at least one numerical feature of the second feature vector, wherein the weight for a numerical feature of the second feature vector depends on a deviation measure indicative of a degree of deviation of the numerical feature of the second feature vector from a corresponding numerical feature of the reference feature vector of the reference model, wherein numerical features of the second feature vector with larger deviations from the corresponding numerical feature of the reference feature vector are assigned higher weights than numerical features of the second feature vector with smaller deviations from the corresponding numerical feature of the reference feature vector; and
re-identifying the detected second object as being the detected first object when the first feature vector is determined to correspond to the second feature vector according to a similarity measure between the first and second feature vectors being less than a threshold, the similarity measure is calculated using the assigned weights so that numerical features with higher weights are emphasized more than numerical features with lower weights in the calculation of the similarity measure.

10. A system comprising the apparatus according to claim 9, and at least one image acquisition device for capturing images of at least one scene including objects.

* * * * *